K. E. AHLBERG.
DUAL SPEED TRANSMISSION.
APPLICATION FILED DEC. 12, 1919.
1,381,051.
Patented June 7, 1921.
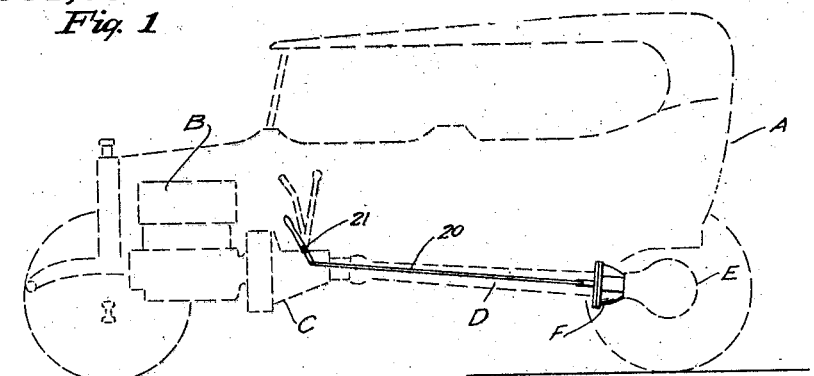
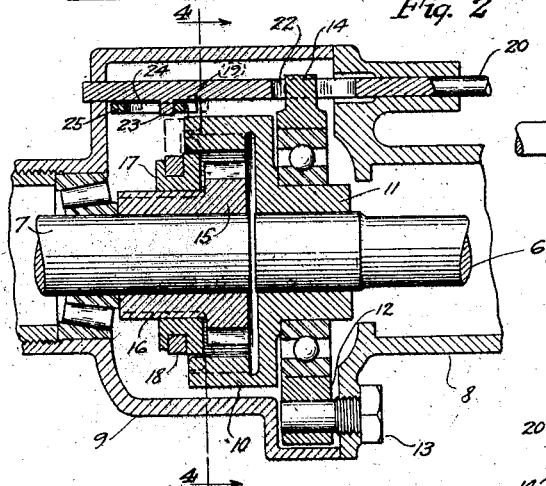
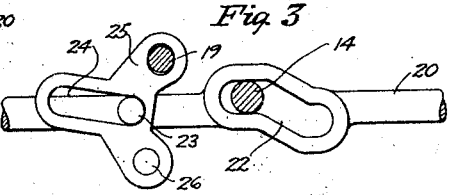
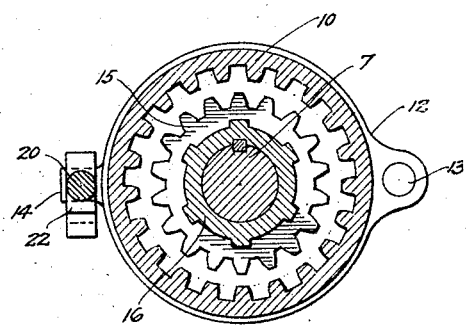
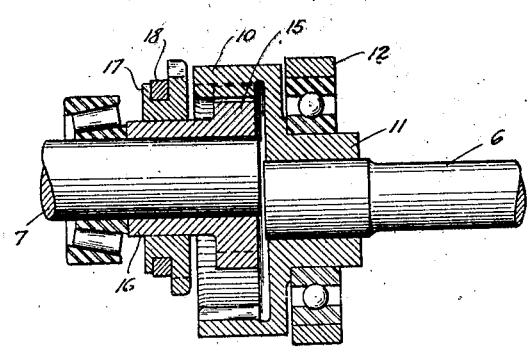
Inventor
Karl E. Ahlberg
by Nestall and Wallace
his Attorneys

UNITED STATES PATENT OFFICE.

KARL E. AHLBERG, OF LOS ANGELES, CALIFORNIA.

DUAL-SPEED TRANSMISSION.

1,381,051.  Specification of Letters Patent.  Patented June 7, 1921.

Application filed December 12, 1919. Serial No. 344,447.

*To all whom it may concern:*

Be it known that I, KARL E. AHLBERG, a citizen of the United States, residing at Los Angeles, in the county of Los Angeles and State of California, have invented new and useful Improvements in Dual-Speed Transmissions, of which the following is a specification.

This invention relates to a change speed transmission especially adapted for automobiles, and is intended to act in conjunction with the usual change speed transmission.

It is the primary object of this invention to provide a transmission which is adapted to be disposed in a divided shaft, and whereby a direct drive or a change of speed drive between the sections of the shaft may be obtained. It is another object of this invention to provide a transmission in which there are no idle rotating gears, when the parts are disposed for direct driving.

These objects will be more fully understood, as will also other objects and corresponding accomplishments of my invention from the following detailed description of a preferred embodiment thereof. For the purpose of this description, reference is had to the accompanying drawing, in which:

Figure 1 is a side elevation of an automobile, engine, transmission case, propeller shaft case, and differential casing shown in dotted lines, my improved transmission case being shown in full lines; Fig. 2 is an enlarged horizontal section through my improved transmission and its case with the parts in position for direct drive; Fig. 3 is an enlarged detail view of the means for operating the clutch and throwing in and out the gears; Fig. 4 is a section taken on the lines 4—4 of Fig. 2 with the case removed; and Fig. 5 is a section taken at right angles to the section shown in Fig. 2 with the case removed and the gears shown in mesh.

Referring more particularly to Fig. 1, A indicates an automobile body and B the engine. The usual transmission is indicated by C and the torque tube by D. E is the differential, and F is my improved transmission.

Referring more particularly to Figs. 2, 3, 4, and 5, the section of the propeller shaft connected to the transmission C is indicated by 6. The section of shaft leading to the differential is indicated by 7. This forms a divided shaft consisting of a drive section and a driven section. Shaft 6 in the usual manner has a universal joint at its forward end so that the rear end may be moved through an angle. Section 8 of the case is connected to the torque tube by resorting to any well known mechanical expedient. Section 9 of the case is attached to the tube section of the differential case. Secured to the shaft section 6 is an internal gear 10. A hub is formed on the internal gear, and rotatably mounted thereon by means of ball bearings is a yoke 12. Yoke 12 is pivoted to the casing by means of a pin 13. This permits the internal gear to be raised and lowered. Diametrically opposite to the pin 13 is a follower pin 14 formed upon yoke 12, by means of which the yoke is swung, as later described.

Keyed to shaft section 7 is a pinion 15 adapted to mesh with gear 10. Pinion 15 is formed with a hub 16 having keys thereon, and splined upon the hub 16 is a clutch 17. Clutch 17 is of the type having teeth on its periphery which will engage the teeth on internal gear 10. A strap 18 is disposed in a groove in the clutch for the purpose of shifting the clutch into and out of engagement with gear 10. An arm 19 is secured to the strap and ends in a pin.

The construction is such that when the shaft sections 6 and 7 are in alinement, gear 10 and pinion 15 will be out of engagement; clutch 17 will be in engagement with gear 10, thereby providing a direct drive from shaft section 6 to shaft section 7. When it is desired to change the speed ratio between the shaft sections, clutch 17 is thrown out of engagement with gear 10 and the latter lowered to mesh with pinion 15.

Various means may be employed to shift the clutch and raise and lower the gear 10. For the purpose of illustration, I have shown one means comprising a rod 20 slidingly mounted in the casing. This rod may be conveniently extended and connected to a lever 21, see Fig. 1, disposed within the car convenient for operation by the driver. Formed in the rod 20 is a cam slot 22, in which follower pin 14 rides. Thus, on moving the rod forwardly, pin 14 will ride downwardly and lower the gear 10 into the position shown in Fig. 5. Before this is accomplished, clutch 17 is thrown out of engagement. I have provided for this by securing to the rod 20 a pin 23 disposed to ride in the slot 24 of a link 25. Link 25 is pivoted at 26 to the casing and has an elongated opening in which arm 19 is disposed. When rod 20 is moved to the rear, link 25 is swung about pivot pin 26, moving arm 19 and clutch 17 from engagement with gear 10. When slot 24 has reached its horizontal position, it is compelled to maintain the same, while pin 23 may slide along the slot, thereby permitting a long movement of rod 20. This permits the angle of slot 22 to be made gradual. Pin 14 rides into the lower part of cam slot 22, but clutch 17 has been thrown out of engagement before pin 14 has been moved far enough to cause gear 10 to engage pinion 15. Upon reverse movement of rod 20, gear 10 is disengaged from pinion 15 before clutch 17 is engaged.

It is obvious that I have provided a simple gear having few parts and so constructed that it is strong and durable. By reversing the position of the internal gear and the pinion, a structure may be provided suitable for gearing down the speed. This would be advantageous in trucks and like vehicles.

What I claim is:

A transmission comprising the combination of a drive shaft and a driven shaft, said drive shaft being mounted to swing through an angle, an internal gear fixedly mounted on said drive shaft, a pinion for meshing with said gear fixedly mounted on said driven shaft, whereby the gear may be swung laterally into mesh with said pinion, an independent clutch splined to rotate with said driven shaft for directly coupling said shafts when said gear and said pinion are out of driving engagement, and means to shift said gear relative to said pinion and simultaneously shift said clutch.

In witness that I claim the foregoing I have hereunto subscribed my name this 5th day of December, 1919.

KARL E. AHLBERG.